No. 671,490. Patented Apr. 9, 1901.
W. B. POTTER.
CONTROLLER FOR ELECTRIC MOTORS.
(Application filed Dec. 30, 1897.)
(No Model.)
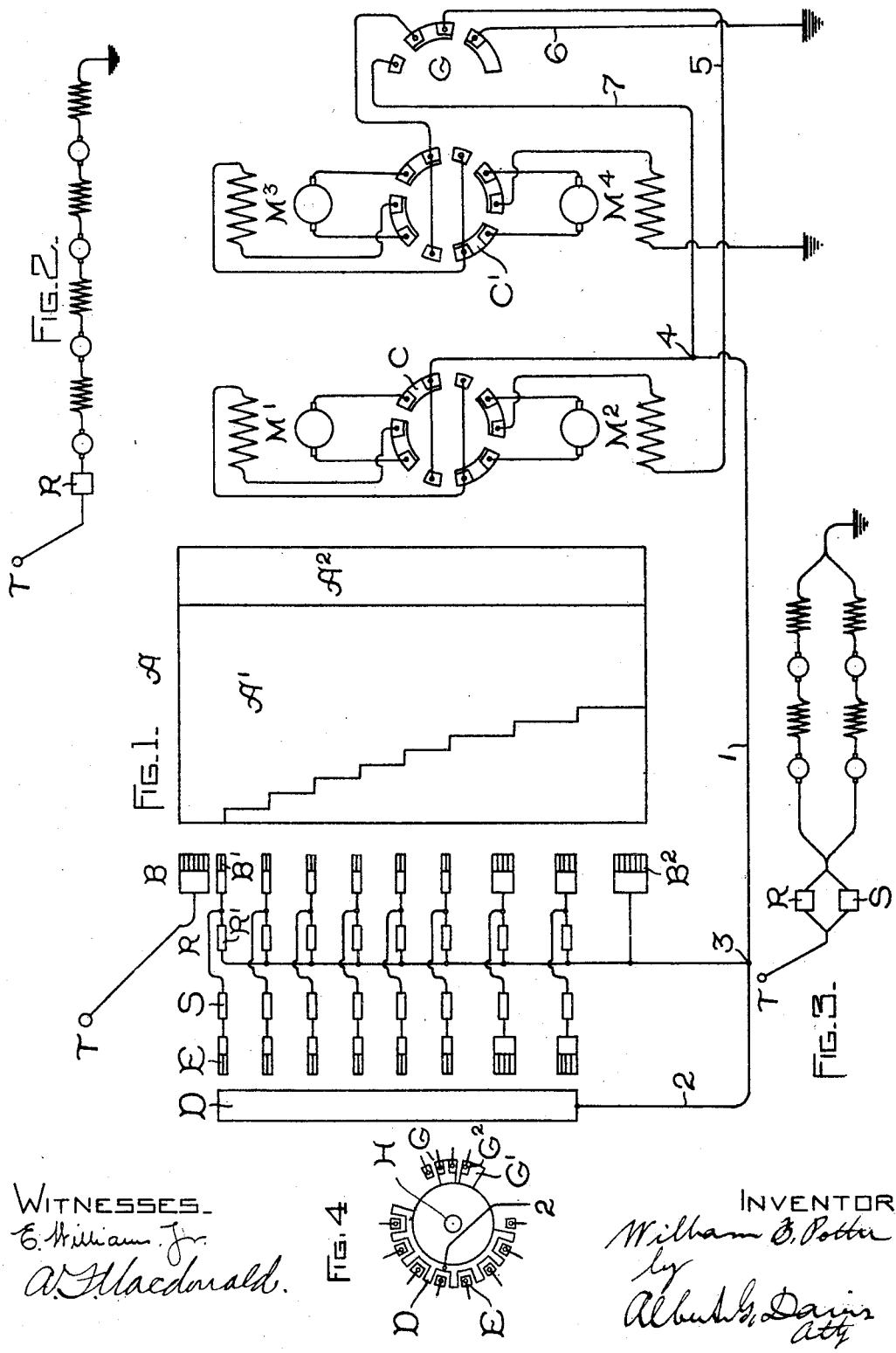

UNITED STATES PATENT OFFICE.

WILLIAM B. POTTER, OF SCHENECTADY, NEW YORK, ASSIGNOR TO THE GENERAL ELECTRIC COMPANY, OF NEW YORK.

CONTROLLER FOR ELECTRIC MOTORS.

SPECIFICATION forming part of Letters Patent No. 671,490, dated April 9, 1901.

Application filed December 30, 1897. Serial No. 664,595. (No model.)

*To all whom it may concern:*

Be it known that I, WILLIAM B. POTTER, a citizen of the United States, residing at Schenectady, in the county of Schenectady, State of New York, have invented certain new and useful Improvements in Controllers for Electric Motors, (Case No. 648,) of which the following is a specification.

In the well-known series-parallel controller it is customary to use the same resistance for controlling the motors in parallel that is employed when the motors are connected in series. With motors of moderate capacity, requiring only a limited current, this arrangement is satisfactory; but when the motors are large, such as are employed on locomotives, and require a heavy current the current-carrying capacity of a resistance which is amply sufficient when the motors are connected in series is too small when the motors are connected in parallel. For example, assume that a current of two hundred amperes at five hundred volts will flow through four motors when connected in series with one another and the resistance and that the controlling resistance is designed to carry this amount without excessive heating, these same motors when connected in parallel groups with two motors in series in each group should receive a total current of four hundred amperes at the same voltage; but if it should be attempted to reduce the resistance in the motor-circuit by merely cutting out a portion of the same resistance which is used in the series connection this resistance would not be able to carry the four hundred amperes, since it is designed to carry only two hundred amperes without excessive heating. In order therefore to adjust the rheostat constituting the resistance for the parallel connection, it is necessary that its current-carrying capacity should be increased at the same time that its resistance is reduced.

In the particular embodiment of my invention which I have illustrated it is possible to adjust the rheostat for increased current-carrying capacity and reduced resistance by constructing it with two resistance-sections, one of which is used alone when the motors are connected in series and both of which are connected in multiple when the motors are connected in parallel groups.

It is desirable to provide the same number of resistance-controlling steps for the motors when connected in parallel as in series and to have the same acceleration per step in both cases.

My invention has for its object to provide in a control-circuit a controller so arranged that its current-carrying capacity may be changed in accordance with the conditions existing in said circuit.

More specifically stated my invention comprises a motor-controller which is so arranged that the motors to be controlled may be connected in series or parallel with the proper amount of controlling resistance in circuit to give the same acceleration per resistance step in both cases, at the same time adjusting the current-carrying capacity of the controlling resistance or rheostat. This I accomplish by providing a switch so arranged that it will reduce the controlling resistance by one-half, at the same time doubling its current-carrying capacity when the motors are connected in parallel. By this arrangement the motors may be started from a standstill, either connected in series or parallel, without injury to the controlling resistance.

In the accompanying drawings I have shown my invention applied to a controller similar to the one shown in Patent No. 583,935, dated June 8, 1897, and issued to F. E. Case and myself; but for the sake of simplicity all unnecessary parts have been omitted.

Figure 1 is a general diagrammatic view of the controller and motor connections. Figs. 2 and 3 are diagrams of motor combinations, and Fig. 4 is a detail view showing the means employed for simultaneously operating the series-parallel and resistance switches.

The controller is shown in connection with a four-motor equipment, in which the motors are permanently coupled in pairs and the pairs treated as a single unit; but my invention can be employed equally well with other forms of controllers, whether series-parallel or rheostatic merely. The resistance-cylinder A comprises a notched metal plate A', which is mounted on an insulating-support $A^2$ and is adapted to be moved into engagement with the vertical row of stationary brushes B and cut resistance R into and out of the motor-circuit. Resistance R comprises a set of resistance-sections, each section consisting of a small resistance-box R', included in a separate circuit and adapted to be connected in multiple with the other boxes for reducing the total resistance of the circuit. When all of the brushes in line B rest on contact-plate A', the resistance is short-circuited and current enters from trolley T and passes directly to wire 1 and the motors. The motors are arranged in pairs and provided with reversing-switches C and C'. The switches, while being mechanically separate in the drawings, are preferably connected for simultaneous movement. The motors are coupled in series or parallel relation by a switch G. With the parts in the position shown the motors M' to $M^4$ are connected in series. Thus far the connections and arrangement of the switches are limited to Patent No. 583,935, above referred to; but in addition a separate switch D is provided, which is adapted to reduce the resistance value of the controlling resistance by including resistance S in multiple with resistance R. Switch D is connected by wire 2 to the main circuit-wire 1 and by means of the contact-brushes E operates to connect the respective sections of the resistances R and S in multiple. It is preferable to gradually decrease the amount of resistance contained in the steps as they progress from the top to the bottom, and as resistance S can be decreased in the same proportion the closing of switch D does not affect the relative decrease between steps, but it decreases the total resistance value of the controlling resistance or rheostat one-half, at the same time doubling its current-carrying capacity by establishing two multiple paths of equal carrying capacity. The arrangement of the parts is such that the closing of switch D has no effect on the motors until switch-cylinder A is moved into engagement with the brushes, so that resistance-cylinder A controls the opening and closing of the circuits, as before, only the total resistance is decreased by one-half.

In Fig. 4 I have shown the auxiliary resistance-switch D and the series-parallel switch G mounted on a common support and actuated by shaft H. Contacts D and G' are mounted on an insulating-support and are moved into engagement with stationary resistance-contacts E and the series-parallel contacts $G^2$. Contact D is connected to the circuit by wire 2, and contacts G' are adapted to bridge the stationary contacts $G^2$.

The operation of the controller is as follows: Contact-plate A' is moved into engagement with the stationary line of brushes B. In the first position the circuit is as follows: Current enters from trolley T to contact-plate A', to brush B', through the resistance R', wire 1, reversing-switch C, armature and field of motor M' to the reversing-switch and armature and field of motor $M^2$ to series-parallel switch G, to reversing-switch C', to armature and field of motor $M^3$, to reversing-switch and armature and field of motor $M^4$ to ground. The motors are then connected as shown in Fig. 2. A further movement of contact-plate A' reduces the resistance of the circuit by including a number of resistance-paths in parallel with each other until the brush $B^2$ rests upon the plate and all of the resistance will be short-circuited. Assuming that it is desired to run the motors in parallel, switch A is brought to the position shown, switch D moved into contact with stationary brushes E, and switch G thrown to the parallel position. The circuit will then be as follows: Current flows from trolley T to contact-plate A', to brush B', where the current divides, one half passing through resistance R' to wire 1 and the other half through the resistance S, brush E, switch D, and wire 2 to point 3, where it unites with the current from resistance R' and flows through wire 1 to point 4, where the circuit divides, one path being through motors M' and $M^2$ in series by wire 5 to switch G and to ground by wire 6. Starting again at point 4, the second circuit is by wire 7 to series-parallel switch G, to reversing-switch C', and thence through motors $M^3$ and $M^4$, in series, to ground. With this arrangement the resistance value of the controlling resistance or rheostat has been reduced by one-half; but the current-carrying capacity has been doubled and the motors are connected as shown in Fig. 3.

What I claim as new, and desire to secure by Letters Patent of the United States, is—

1. In combination, a control-circuit, a rheostat therein, and means for changing the current-carrying capacity of the said rheostat.

2. In combination, a control-circuit, a controlling-switch in said circuit, a rheostat therefor, and means for changing the current-carrying capacity of said rheostat.

3. In combination, in a control-circuit, a rheostat, a controller for successively connecting the resistance-sections of said rheostat into circuit, and means for changing the current-carrying capacity of the resistance-sections acted upon by the controller.

4. In combination, in a control-circuit containing electrically-operated devices, a rheostat in circuit with all of said devices, and means for changing the current-carrying capacity of said rheostat.

5. In combination, a controlling-switch, a rheostat therefor, and an adjusting-switch for changing the current-carrying capacity of said rheostat.

6. The combination with a rheostat, of a controller for successively connecting the resistance-sections of said rheostat into circuit, and an adjusting-switch for changing the value of the resistance-sections acted upon by said controller.

7. In combination, a controlling-switch, a controlling resistance therefor, comprising a plurality of separate resistances, and a switch independent of the controlling-switch for varying the current-carrying capacity of said resistance.

8. In combination, a controlling resistance, comprising a plurality of sets of resistance-sections, means for connecting and disconnecting the respective sections in each set, and means for cutting said resistance into and out of circuit.

9. In combination, a controlling resistance, comprising a plurality of sets of resistance-sections, a permanent connection leading from one of said sets to a work-circuit, means for connecting the respective sections of the remaining sets in multiple with those of the first set, and means for cutting said resistance into and out of circuit.

10. In combination, a rheostat connected to a motor-circuit, a switch for changing the grouping of the motors, means for varying the current-carrying capacity of the rheostat, and means for cutting said rheostat into and out of circuit.

11. In combination, a rheostat connected to a motor-circuit, contacts for cutting the rheostat into and out of circuit, contacts for changing the grouping of the motors from series to parallel, without changing the resistance connections, and means for increasing the current-carrying capacity of the rheostat when the motors are connected in parallel.

12. In an electric controller, the combination of a switch for establishing a series-parallel relation of the motors, a plurality of switches in the motor-circuit, one of said switches being employed to control the current flowing to the motors when connected in series or in parallel, and the other switch or switches to increase the current-carrying capacity of the first-named switch in controlling the motors when they are connected in parallel.

13. In an electric controller, the combination of a pair of switches for cutting resistance into and out of circuit, one of said switches being arranged to alter the resistance step by step, the other to cut all the resistance which it controls into or out of circuit at a single movement.

14. In an electric controller, the combination of a switch for connecting the motors in series or parallel, a controlling resistance, and two separate sets of contacts for controlling said resistance, one of said sets being controlled by the switch which connects the motors in multiple.

15. In a controller for electric motors, which is arranged to open the circuit between its series and parallel positions, the combination of a resistance, contacts for varying the resistance of the motor-circuit, a separate switch for establishing a series of parallel relation of the motors, and a resistance-switch controlled by the series-parallel switch, for including an auxiliary controlling resistance in parallel-circuit relation with the main resistance to increase the current-carrying capacity of the resistance when the motors are connected in parallel.

16. In an electric controller, the combination of a controlling resistance composed of two elements, one element being employed at all times, the other only when the motors bear a certain relation to each other, and a switch for connecting the elements together, in order to increase the current-carrying capacity of the controlling resistance.

17. In combination in a control-circuit, a controlling-switch, a rheostat therefor, and means for simultaneously increasing the current-carrying capacity and decreasing the resistance of said rheostat.

In witness whereof I have hereunto set my hand this 29th day of December, 1897.

WILLIAM B. POTTER.

Witnesses:
B. B. HULL,
C. L. HAYNES.